United States Patent
Vaidyanathan et al.

(10) Patent No.: US 7,539,943 B2
(45) Date of Patent: May 26, 2009

(54) SYSTEMS AND METHODS FOR TRACKING FILE MODIFICATIONS IN SOFTWARE DEVELOPMENT

(75) Inventors: Shankar Vaidyanathan, Sammamish, WA (US); Meghan Rae Perez, Redmond, WA (US); Tarek Madkour, Sammamish, WA (US); Douglas Todd Neumann, Cary, NC (US)

(73) Assignee: Microsoft Corporation, Redmond, WA (US)

( * ) Notice: Subject to any disclaimer, the term of this patent is extended or adjusted under 35 U.S.C. 154(b) by 604 days.

(21) Appl. No.: 10/891,216

(22) Filed: Jul. 14, 2004

(65) Prior Publication Data

US 2006/0015863 A1    Jan. 19, 2006

(51) Int. Cl.
    *G06F 3/00*    (2006.01)
(52) U.S. Cl. .............. 715/744; 715/745; 715/746; 715/762; 715/763; 715/781; 715/805; 717/106; 717/107; 717/109; 717/110; 717/120; 717/122; 717/170
(58) Field of Classification Search ............. 717/170, 717/106–107, 109–110, 120, 122; 715/744–746, 715/762, 763, 511, 781, 805; 714/37–38
See application file for complete search history.

(56) References Cited

U.S. PATENT DOCUMENTS

| | | | |
|---|---|---|---|
| 6,108,668 A * | 8/2000 | Bates et al. | 707/203 |
| 6,111,575 A * | 8/2000 | Martinez et al. | 715/810 |
| 6,185,591 B1 * | 2/2001 | Baker et al. | 715/531 |
| 6,393,437 B1 | 5/2002 | Zinda et al. | 707/201 |
| 6,523,134 B2 * | 2/2003 | Korenshtein | 714/16 |
| 2003/0005093 A1 * | 1/2003 | Deboer et al. | 709/220 |
| 2003/0122873 A1 * | 7/2003 | Dieberger et al. | 345/764 |

OTHER PUBLICATIONS designate. (n.d.). Dictionary.com Unabridged (v 1.1). Retrieved Jan. 14, 2008, from Dictionary.com website: http://dictionary.reference.com/browse/designate.*

(Continued)

*Primary Examiner*—Weilun Lo
*Assistant Examiner*—Rashedul Hassan
(74) *Attorney, Agent, or Firm*—Woodcock Washburn LLP

(57) ABSTRACT

A software development environment exposes a GUI with visual markings for differentiating developer modifications to software files. The differentiation techniques can be provided as defaults with embodiments of the invention, or can be customizable to allow for useful grouping of modifications. The software development environment may also provide a selection tool for accepting, rejecting, or further modifying previous file modifications. A history of modifications may be maintained in the event that a developer needs to re-implement modifications that have been removed or distorted. A navigation tool facilitates analysis of modifications.

25 Claims, 13 Drawing Sheets

OTHER PUBLICATIONS

Hardock, G., Kurtenbach, G., and Buxton, W. (1993). A Marking Based Interface for Collaborative Writing. Proccedings of UIST'93., 259-266. http://www.billbuxton.com/Mate.html.*

Atkins, D.L. et al., "Using Version Control Data to Evaluate the Impact of Software Tools: A Case Study of the Version Editor," *IEEE Trans. on Software Engineering*, 2002, 28(7), 625-637.

Baker, B., "Version Control Keeps Rework to a Minimun," *EDN*, 2003, 48(26), 24.

Dattolo, A. et al., "Collaborative Version Control in an Agent-Based Hypertext Environment," *Information Systems*, 1996, 21(2), 127-145.

Lee, B.G. et al., "An Integrated Approach to Distributed Version Management and Role-Based Access Control in Computer Supported Collaborative Writing," *J. Systems and Software*, 2001, 59(2), 119-134.

\* cited by examiner

■ = 331 Modified on Date #1
▨ = 332 Modified pursuant Action #3 on Date #1
☐ = 333 Modified on Date #2, time interval #3
▯ = 334 Modified pursuant to Action #12

SYSTEMS AND METHODS FOR TRACKING FILE MODIFICATIONS IN SOFTWARE DEVELOPMENT

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2004, Microsoft Corp.

FIELD OF THE INVENTION

This invention relates to computer assisted software development, and more particularly to systems and methods for intelligently tracking modifications to files such that modifications are easily identified and manipulated by developers in intervals between sync and check-in operations.

BACKGROUND OF THE INVENTION

Modern software is typically created with a great deal of computer automated assistance. Such assistance is commercially available in a variety of software development environments. For example, MICROSOFT'S VISUAL STUDIO®, BORLAND'S C++BUILDER®, METROWERK'S CODE WARRIOR®, and IBM'S WEBSPHERE STUDIO® are all products presently available to assist in the software creation. Such products provide a range of useful functions, such as coordinating communications between multiple developers working together on large projects, assisting in the actual writing of source code, assisting in specifying how a source code file will be compiled, and providing compilers that convert a source code file into executable files.

A typical software development environment is illustrated in FIG. 1a. As suggested by the figure, a central server 100 coordinates the efforts of a number of developers 110, 115, 120, 125. A developer is a person involved in implementing a software application. In FIG. 1a, the developers 110, 115, 120, 125 are depicted as client computers, because the developer will likely use a client computer as a tool in software development. Developer actions include instructions carried out by a developer's computer. The developers 110, 115, 120, 125 may each have a variety of responsibilities in implementing aspects of a large software application. It is important that these aspects work together and do not unduly interfere with the operation of the application under development. It is also preferable to ensure centralized control over the application, so that developers 110, 115, 120, 125 cannot inadvertently alter the application without approval through the proper channels. Without such centralized control, the development environment can quickly become one in which there are many copies of an application, each with differing features, and it becomes impossible to move forward with production.

Thus the central server 100 is frequently called a "Source Code Control" (SCC) engine 100. The means by which most SCC engines 100 coordinate development is through sync and check-in procedures. When a developer, e.g. 110, first retrieves existing software under development from the SCC engine 100, it is called a sync 111. A sync creates a copy of the application on the developer's client computer 110. This provides the developer 110 with an official copy of the application under development, so he can work with the existing features of the application.

A check-in 112 occurs when the developer 110 returns his or her modifications to the SCC engine 100; and thereby updates the official version of the application under development. A set of modifications may be subject to review prior to check-in 112. If the modifications made by developer 110 conflict with other modifications, e.g. those of developer 115, then the modifications may have to be scrapped. Developer 110 may be required to rework the source code that he or she originally wrote. There are numerous other reasons approval of developer's 110 work may be denied, preventing check-in 112. For example, the modifications may create a security issue, or they may not meet design requirements.

SCC engines 100 may save copies of an application under development after every check-in. If a problem is discovered, the source of the problem can be uncovered by backtracking through the various saved versions of the application. Diagnostic tests can be run against applications both with and without a set of modifications. Also, if a developer 110 inadvertently damages a client copy of an application, he or she can retrieve the latest version, or any version, of the application via a sync 111 operation with the SCC engine 100. Another benefit of this arrangement is insurance against massive team-wide failures. A developer 110 can only damage a client copy of the application. A check-in 112 that causes widespread damage to an official SCC engine 100 version of an application will not lead to massive failure, because the development team can simply return to a version of the application prior to check-in 112.

However, a developer 110 may go several weeks or longer prior to checking in modifications. In this time, a developer 110 may do significant amounts of work. If this work is inadvertently damaged or lost, a developer may experience a substantial setback regardless of the availability of the SCC engine 100 to supply the latest official version of an application. Moreover, the potential solution of saving multiple copies, as work progresses, on a developer's 110 client device is inadvisable in the context of software development. Just as with the potential problem of copy proliferation in a development team, a single developer will typically avoid making multiple copies of an application under development, because copies will quickly proliferate, causing headaches in determining which copy is which and potentially supplying erroneous copies for check-in 112.

FIG. 1b illustrates an exemplary developer work schedule in the form of a timeline. The timeline begins with a sync 151 and ends with a check-in 196. During the first week, a developer begins work on an aspect of an application under development to which he or she is assigned. The developer devotes significant time to the assignment, and generates a substantial portion 152 of the requisite source code. This first substantial portion 152 of source code will be referred to as modifications 152. For the purpose of this document, a modification is both a creation of and an alteration to any portion of software under development.

Later in the first week, the developer discovers a potential improvement to modifications 152, and goes about implementing modifications 153. Modifications 153 include removing parts of modifications 152, replacing some of modifications 152 with alternative lines of source code, and adding some source code to modifications 152.

In the second week, the developer again discovers a potential improvement to modifications 152, and goes about implementing modifications 161. Modifications 161 include removing parts of modifications 152 and modifications 153, replacing some of modifications 152 with alternative lines of source code, and adding some source code to modifications 152.

Later in the second week, the developer discovers that modifications 153 may actually lead to problems later on in the development process. After consideration, the developer determines that by making modifications 162 that replace most of modifications 153, the advantages of 153 can be retained without the potential problems down the road. So developer makes modifications 162, which replace much of 153.

In week three, developer makes modifications 171, which include several minor additional changes to clean up the work done so far prior to seeking approval for check-in 172. As this time line shows, by the time of submission for approval prior to check-in 172, a developer's work may have undergone a rather convoluted process of modifications.

The timeline is further complicated by the possibility that approval will be denied, as in 181. As part of such a denial, 181, a developer may be asked to rework specific portions of prior modifications in order to comply with the development goals. Perhaps, even though the developer's modifications 162 improved the software under development, these modifications presented unacceptable conflicts with the work of other team members, and so the developer was required to remove modifications 162 and replace them with a non-conflicting way to carry out the same function.

Later in Week 4, the developer discovers 182 that modifications 153, as originally written, would satisfy the requirements of the team. However, modifications 153 were overwritten by modifications 162, and according to good development practice, no copy of modifications 153 was saved. The developer is forced to redo the work that was previously done in implementing modifications 153. In the exemplary timeline, the developer grudgingly does so in week 5, at the expense of spending precious time that could be spent on other software development. Finally, the developer resubmits his or her work for approval for check-in, and obtains approval 192.

Thus, while the present state of the art allows developers to backtrack to a previous official version of software, this is often inadequate, especially where significant work is done between check-ins. The undesirability of saving multiple copies of software under development makes the loss of work conducted between check-ins more likely, presenting an additional hurdle to potential solutions for the problem.

Some attempts to avoid the problems discussed above have been implemented in current software development environments. For example, refer to FIG. 1c. This figure presents an exemplary display surface 129, such as a computer screen on one of the developer 110, 115, 120, 125 computers in FIG. 1a. The display surface shows a Graphical User Interface (GUI) 130 for a typical software development environment that is presumably running on a corresponding computer. As can be readily observed in FIG. 1c, the GUI 130 has standard drop-down menus such as file 131, edit 132, view 133, and a plurality of buttons 135, 136, 137, etc. for easy access to frequently used functions. In addition, the GUI 130 gives a workspace 128 in which source code can be modified.

One function of present software development environment GUIs 130 may be an Undo 138 and/or Redo 139 function. This allows a developer who mistakenly modifies a file to serially remove previous modifications. If the developer removes to many modifications, he or she may be able to re-insert modifications automatically by selecting redo 139. However, undo 138 and redo 139 are severely limited in present software development environments, and do not provide significant help to developers who find themselves in the situation described with reference to FIG. 1b.

First, undo 138 and redo 139 functions are available only on a session-by-session basis. In other words, modifications made in a first software development environment session cannot be undone with undo 138 after that session is closed. Once a software development environment process is ended, the stack of undo/redo data is discarded. Therefore undo/redo would not help the developer in the situation of FIG. 1b if that developer closed the development tool session at any point between 162 and 191.

Second, undo 138 and redo 139 are only accessible serially. If it is discovered that a modification that was made should be removed using undo 138, all modifications subsequent to the removed modification must also be removed with undo 138. For example, referring to FIG. 1b, the minor modifications 171 must be removed if a developer also wishes to remove modifications 162. The same is true of redo 139. If too many modifications are undone because a desirable modification has been removed, redo 139 can be used but will only recreate the desired modification after recreating all intervening modifications. In the context of software development, where the various modifications are highly interrelated, the costs of inserting or removing modifications contrary to the desires of the developer are high.

In light of the heretofore unacknowledged deficiencies in the art described above, there is a need in the industry to provide better management of software modifications between check-ins.

SUMMARY OF THE INVENTION

In consideration of the above-identified shortcomings of the art, the present invention provides systems and methods for tracking file modifications in software development. The systems and methods disclosed herein are contemplated for use in connection with software development environments. Such a tool can expose a Graphic User Interface (GUI) to software developers. A GUI can supply visual markings for differentiating developer modifications to software files. The differentiation techniques can be provided as defaults with embodiments of the invention, or can be customizable to allow for useful grouping of modifications. A software development environment may also provide a selection tool for accepting, rejecting, or further modifying previous file modifications. A history of modifications may be maintained in a backtracking log should a developer need to re-implement modifications that have been removed or distorted. A navigation tool facilitates analysis of previous modifications. Other advantages and features of the invention are described below.

BRIEF DESCRIPTION OF THE DRAWINGS

The systems and methods for tracking file modifications in software development in accordance with the present invention are further described with reference to the accompanying drawings in which.

DETAILED DESCRIPTION OF ILLUSTRATIVE EMBODIMENTS

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

The following detailed description will generally follow the summary of the invention, as set forth above, further explaining and expanding the definitions of the various aspects and embodiments of the invention as necessary. First a software development environment that exposes a GUI in accordance with the invention is described. Next, preferred systems and methods for implementing the invention are described. Next, the various visual markings suitable for use with the invention are described. Subsequently the techniques for using such markings to differentiate developer modifications to software files are explained. Finally, the modification navigation and selection tools are described, and the use of these tools for analyzing, accepting, rejecting, and re-implementing previous modifications to software files is further explained.

Software Development Environments

Figure 3:
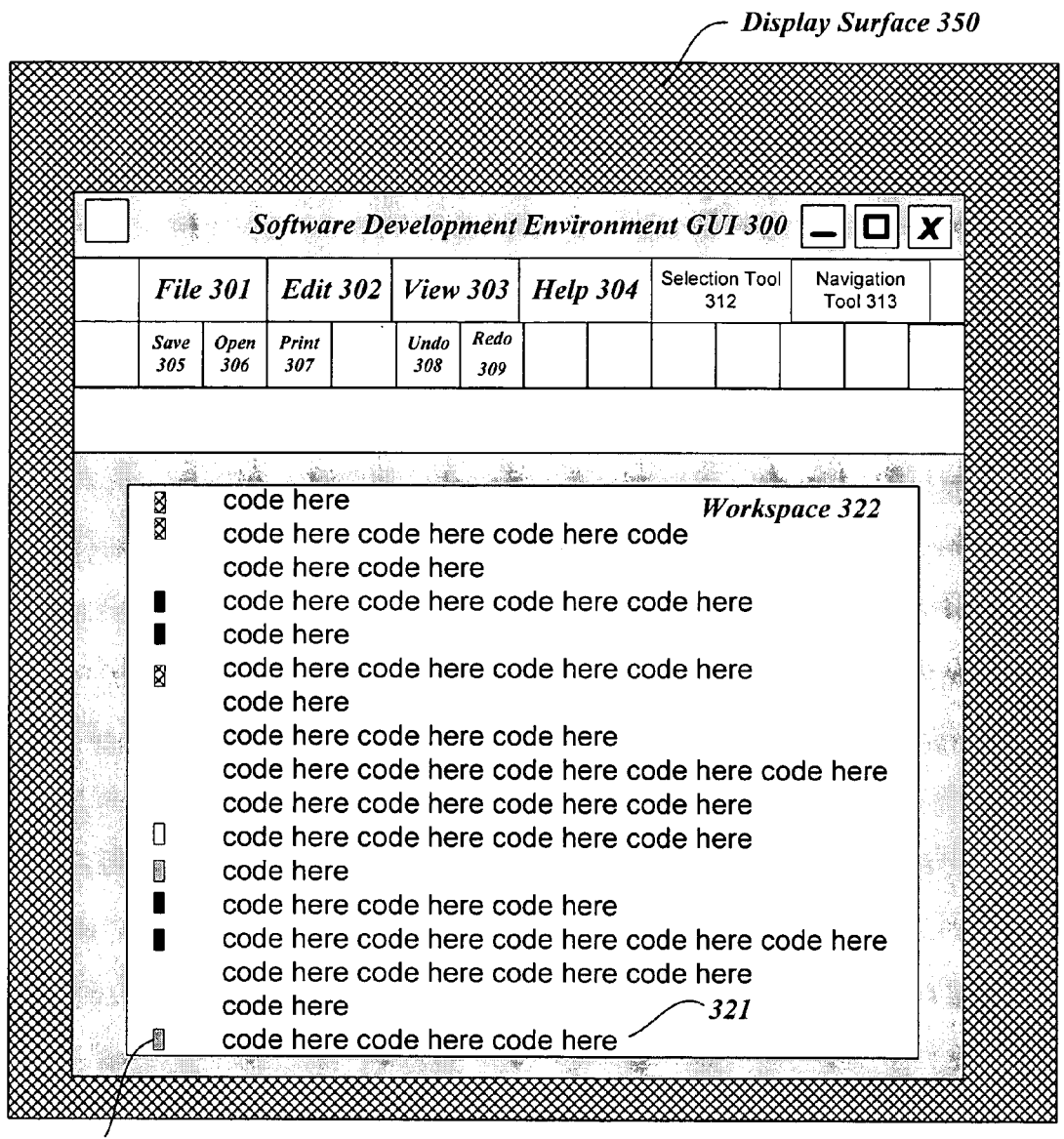
FIG. 3 illustrates a software development environment GUI that provides visual markings to differentiate modifications to software under development. The GUI also allows for accepting or rejecting modifications through the selection tool, and navigation of modifications through the navigation tool.

A software development environment that has features for tracking file modifications in software development can provide a GUI with the features of FIG. 3. FIG. 3 presents a simplified exemplary software development environment GUI 300 window on a display surface 350 such as a computer screen. The GUI 300 comprises a plurality of exemplary menu items such as file 301, edit 302, view 303, and help 304. These menu items, and many other additional menu items, are familiar in the art and a detailed explanation is not provided here. The functions provided in the drop down lists associated with these menu items 301, 302, 303, and 304, as well as the many other available menu items in modern software development environments, can be provided in conjunction with the invention. Menu items 312 and 313 are considered a part of the invention and will be described in detail below.

In addition to exemplary menu items 301, 302, 303, and 304, a software development environment GUI 300 will typically comprise a workspace 322. A workspace is an area where file properties are presented to a software developer for display and modification. The precise data available in a workspace 322 will differ depending on the file and the type of file that is displayed. The present invention expressly contemplates, but is not limited to, three file types that may be presented in the workspace 322 of a typical GUI 300. These three file types are the source file, the project file, and the solution file. Each of these files is known in the art, and may be presented by a software development environment in differing ways. FIG. 3 suggests a source file by setting forth lines of code, e.g. 321. However, this is for the purpose of illustration and it should be understood that the workspace of FIG. 3 may contain any type of file used in software development.

The software development environment GUI presented in FIG. 3 is produced by software that runs on a computer. A computing environment suitable for use with the invention is described at the end of this specification in connection with FIG. 2a, FIG. 2b, and FIG. 2c, below. Note that the computing environment for such software will typically include an arrangement such as that set forth in FIG. 1. In this regard, a software development environment may run on the server 100 of FIG. 1, or on any of the developer's client devices 110, 115, 120, 125. In a preferred embodiment, the software development environment runs on each of the developer's client devices 110, 115, 120, 125, and is capable of communication with the server 100 and the various other client devices. However, software is also developed in many other circumstances in which it may be beneficial to implement the techniques of the invention. For instance, a single developer creating software may find the systems and methods set forth herein helpful, even though such a developer may not experience development difficulties on the same scale or of the same complexity as those in the professional development environment of FIG. 1.

The purpose of software development environments is to assist in the modification of software. In this document, the term modification is used to describe either a creation or an alteration to any portion of software under development. In particular, a change to any part of a source file, a project file, or a solution file is a modification that can be tracked as described herein. Thus, an original writing of several lines of source code is a modification. A subsequent alteration of one of the written lines of source code is a modification. A subsequent addition of multiple new lines of source code is a modification. A change in an ordering of source files is a modification, and so forth. The following brief discussion will describe the typical features of software development environments that allow modification of software. Each of the modifications described in the following non-limiting list may be tracked in accordance with the further aspects of the invention described herein.

Source files, project files, and solution files can all be modified through the sync operation described in the background operation. A sync operation allows a developer to obtain an official copy of software under development on his or her client machine. Such an operation may overwrite any number of existing files on the developer's client computer, delete files from a client computer, or it may generate a plurality of new files on a client computer. Either action is considered a modification as that term is defined here. Similar to a sync is a merge operation, that allows developers to merge an official copy of software under development into the existing copy of the software on the developer's client computer. Merge operations have the advantage of allowing a developer to update his or her official version of software without loosing any modification he or she is working on but has not yet checked in. Because a merge will change properties of files, such an operation results in modifications.

Some modifications are more typically made to specific types of files. For example, there are a number of modifications that can be made to source files using software development environments. A source file is a file containing source code, for example, lines of code writing in the C++ programming language, or lines of code written in any other programming language. When open in a GUI 300, such a file will provide lines of code in the workspace 322 that can be modified directly by a developer, typically via a keyboard input device. Such lines of code can also be modified via a SCC sync or merge, as described above.

Usually, a software development environment GUI will provide a plurality of wizards that allow for the automated modification of source files. A wizard is an automated process that asks a developer a number of questions, and inserts source code into a source file in accordance with the developer's responses to the questions. The result of a wizard is to automatically modify a source file in any number of ways.

A designer also facilitates modifications to source files in many software development environments. A designer typically provides a developer with a number of ready-made components that are visible via the GUI 300. These components can be selected for insertion into a source file in an order determined by the developer. The selection can be made, for example, with a mouse device by "dragging and dropping" a desired component into a source file. The designer will insert the appropriate source code into the source at the location specified by the developer. Thus designers provide another way to modify source files.

As a final example, source files may be modified through the use of external automation. External automation is software that is not provided along with a particular software development environment. Many software development environments allow for the creation of external modification by supporting macros and add-ins. Both macros and add-ins are considered external automation, as well as any other automated process that is permitted to modify a source file and is not a part of the automation provided by a particular software development environment.

Software development environments also frequently provide functions for modification of project files. A project file is a file that describes relationships between source files. Modifications to project files, as with the other files described here, may be made by automated processes. Modifications made pursuant to such automated processes may be tracked using the invention. For example, if a source file is automatically removed from a project file, this modification may be indicated with a visual marking. Typically, when a project file is displayed in the workspace 322 of a software development environment GUI 300, the file can be modified directly or via various available automated functions. A project file can be modified by adding and deleting source files. Similarly, source files may be rearranged in sequence, and source files can be renamed. References in project files may be made to source files or other functional units, and these references can be modified and removed. Another modification that can be made to project files are project renames, i.e. renaming the project so that it can be referred to in another manner by other files in the software under development.

Custom build rules may also be modified in a project file. In general, source files with different file extensions, such as ".cpp" for a source file written in C++, are given to different compilers for the generation of executable files. Moreover, there are many options in the way that a source file may be compiled. It may be compiled for maximum stability, for maximum speed, to minimize the size of the executable, and so on. Changing the "build" or compiling rules for software will greatly affect the resulting output executable file. These build rules may be specified in the project file, and such modifications can be tracked similarly to the other modifications described herein. Build rules may be specified in a plurality of "property sheets" of the type developed for use with MICROSOFT'S® VUSITUAL STUDIO® software development environment. Modifications to one or more of the property sheets specified in a project file for use in building software can also be tracked.

In addition to custom build rules, a project file may specify build steps and compiler and linker options. Build steps may often be performed in a plurality of sequences. A change to build sequence will affect the output executable. A typical sequence involves first compiling source files, then linking source files, and finally copying files to their needed locations. These and other steps, however, may be performed in a variety of sequences and modifications to the build steps, a recorded in a project file, can be tracked as described herein. Similarly, compiler and linker options can be specified to further control the details of how software, originally embodied in source files, is ultimately converted into executable files. Modifications to such compiler and linker options may also be tracked.

Finally, solution files can be modified through some available software development environment GUIs. A solution file can be thought of as a level above the project file. The project files provide the relationships between source files, and the solution file provides the relationships between project files. Just as project files could be modified to change source file names as referenced in the project file, solution files can be modified to change project file names. Solutions files can be modified to add and delete project files. Solution files can also be modified to change project dependencies. The potential modifications to the source, project, and solution files described herein are intended as exemplary file modifications, and are not intended to limit the invention to a particular set of modifications for tracking. It should be understood that any modification to software can be tracked in accordance with the systems and method provided.

Presently Preferred Implementation

Figure 5:
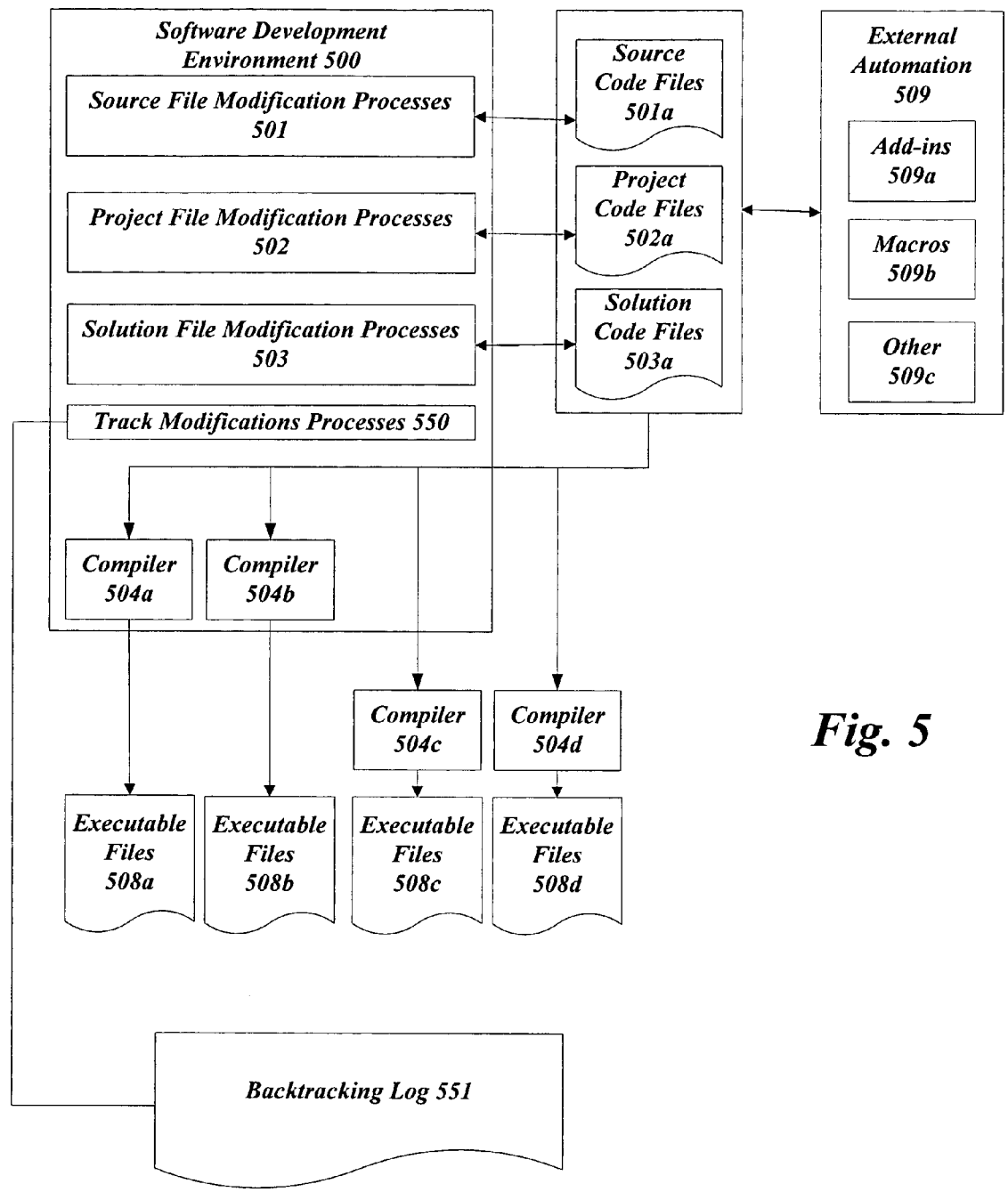
FIG. 5 categorizes the functions of an exemplary software development environment that can track software modifications. A plurality of processes can interact with various types of software files. External automation may also interact with the files. A track modifications process may operate in cooperation with the other processes in a software development environment. Ultimately, the various software files are compiled into executable files for use.
Figure 6:
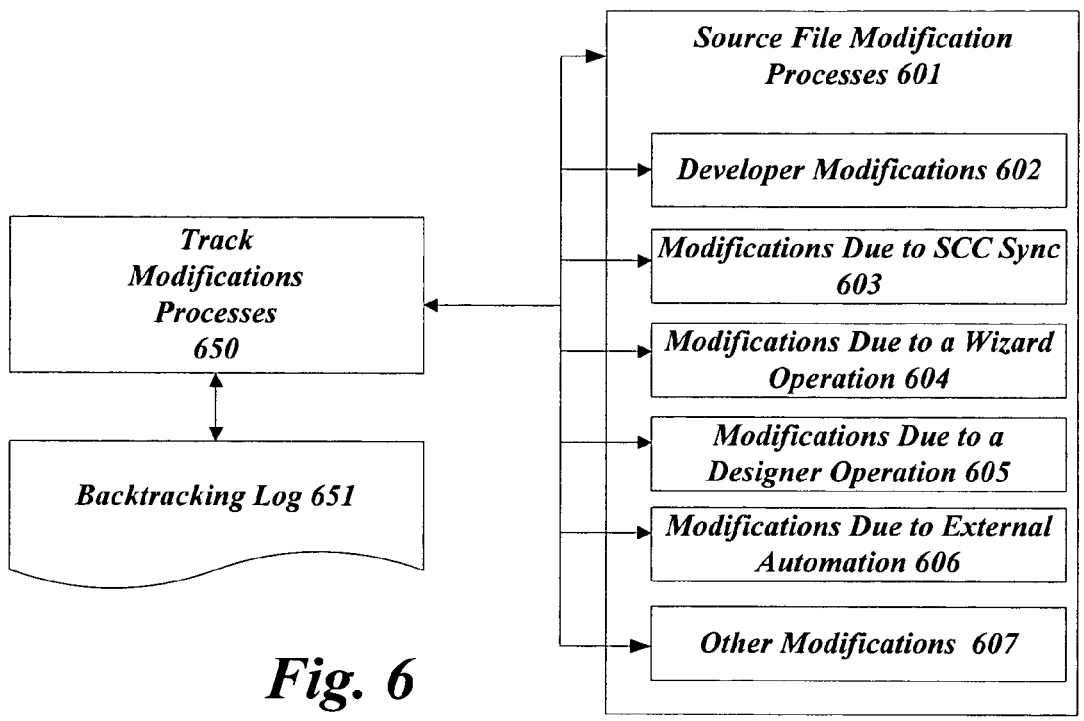
FIG. 6 illustrates the various processes that may be included with the source file modifications process of a software development environment. The track modifications processes may operate in cooperation with all of these exemplary processes.
Figure 7:
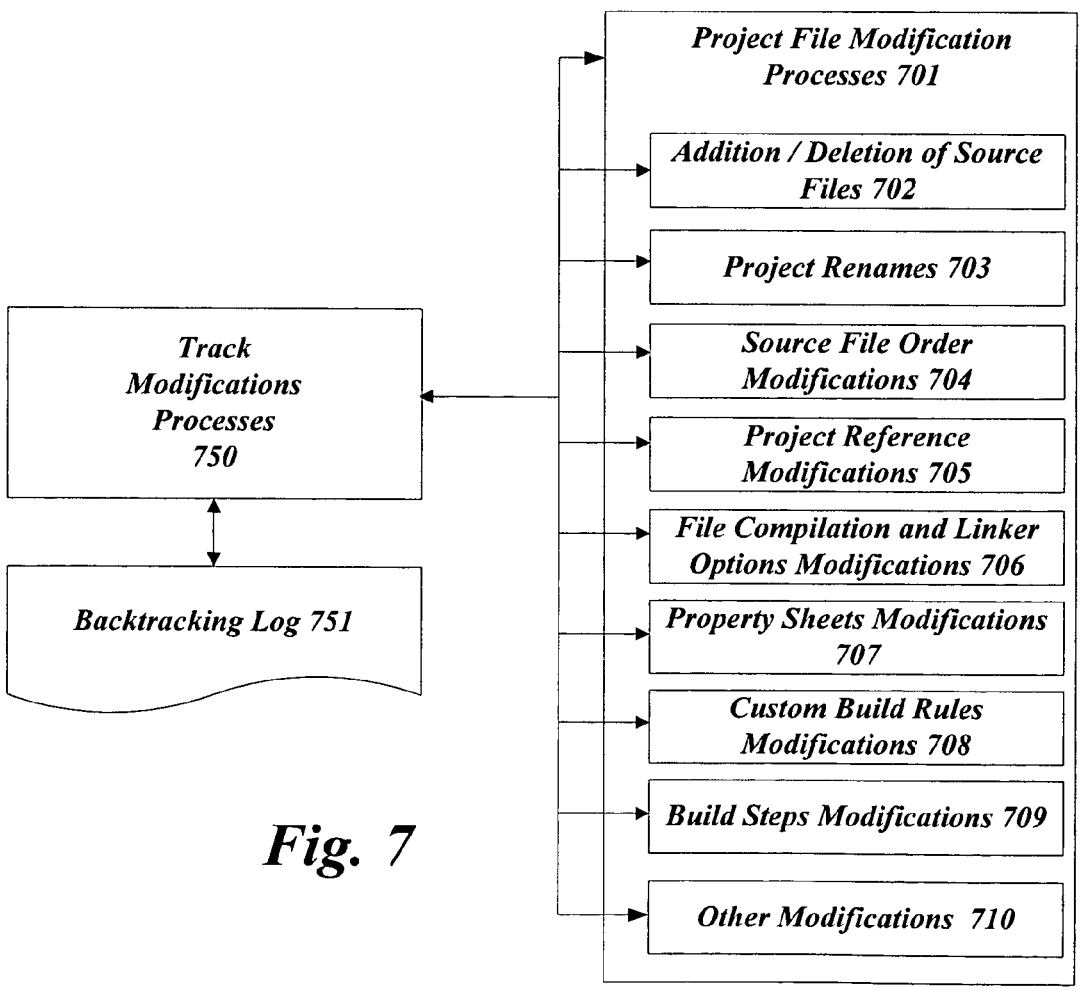
FIG. 7 illustrates the various processes that may be included with the project file modifications process of a software development environment. The track modifications processes may operate in cooperation with all of these exemplary processes.
Figure 8:
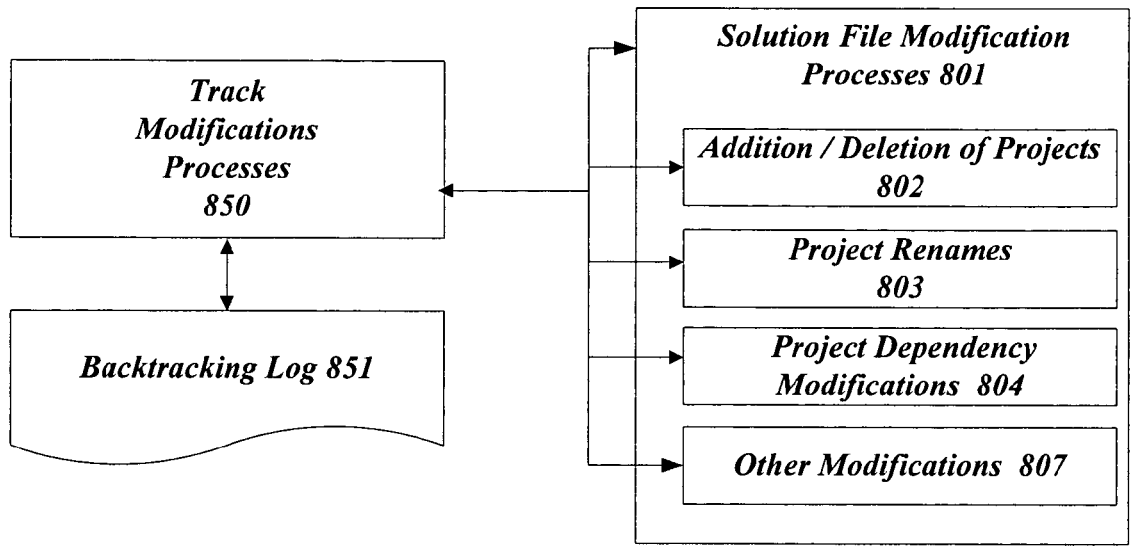
FIG. 8 illustrates the various processes that may be included with the solution file modifications process of a software development environment. The track modifications processes may operate in cooperation with all of these exemplary processes.
Figure 9:
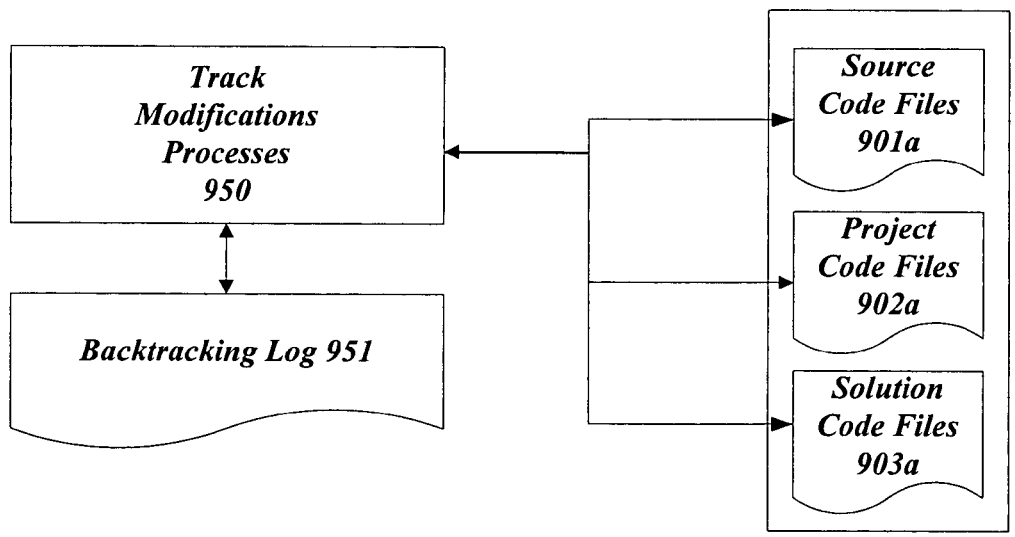
FIG. 9 illustrates how in various embodiments, track modifications processes may have access to software files themselves. Such access can allow for modifications tracking independently of the process cooperation illustrated in FIG. 6, FIG. 7, and FIG. 8.
Figure 10:
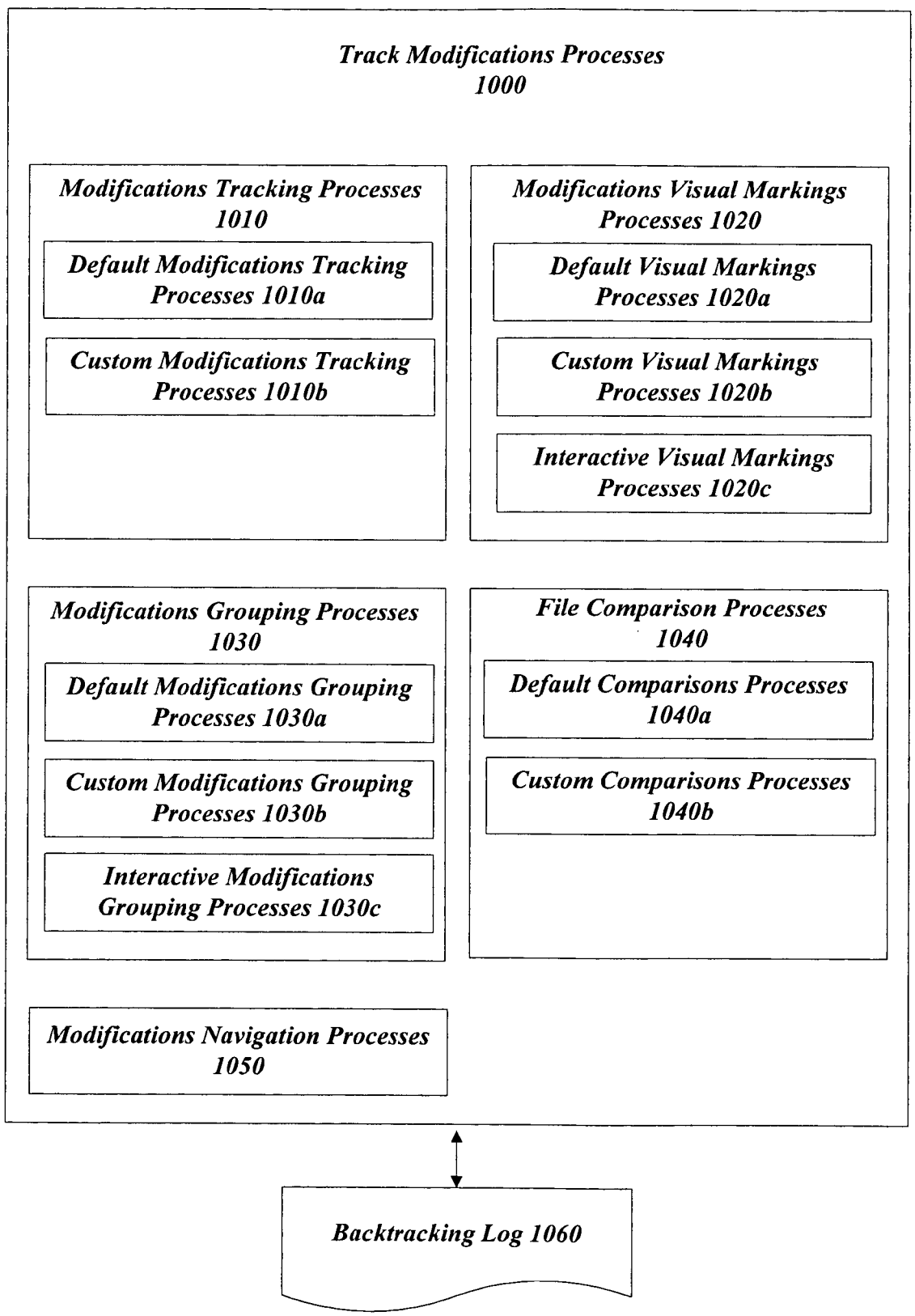
FIG. 10 categorizes various processes that can be included in track modifications processes.

Various techniques for implementing the invention in a computing environment are illustrated in FIG. 5, FIG. 6, FIG. 7, FIG. 8, FIG. 9, and FIG. 10. FIG. 5 illustrates a software development environment 500 that includes track modifications processes 550. FIG. 6, FIG. 7, and FIG. 8 illustrate various techniques for capturing modifications to software files. FIG. 9 illustrates another technique for capturing file modifications that can be used independently or in conjunction with the techniques of FIG. 6, FIG. 7, and FIG. 8. FIG. 10 illustrates various potential components of track modifications processes.

FIG. 5 illustrates a software development environment 500 that includes track modifications processes 550. The various other processes of a software modification tool 500 are also illustrated, namely the source file modifications processes 501, the project file modifications processes 502, and the solution file modifications processes 503. External automation 509 that can modify files 501a, 502a, and 503a is illustrated. As mentioned above, external automation 509 can include add-ins 509a, macros 509b, or other automation 509c. Each of these processes may have access to corresponding files 501a, 502a, and 503a and can modify the files. The files will typically be stored in memory, as explained with reference to the general description of a suitable computing environment, below. The processes 501, 502, and 503 can modify the files 501a, 502a, and 503a by changing the attributes of the files as they are stored in memory.

Software files 501a, 502a, and 503a may ultimately be delivered to one or more compilers 504a, 504b, 504c, and 504d. The compilers 504a, 504b, 504c, and 504d may be bundled with a software development environment 500, such as 504a and 504b, or they may be "external" compilers such as 504c and 504d.

The track modifications processes 550 can capture information relating to file modifications. The track modifications processes 550 can then record captured information needed to undo modifications in a backtrack log 551. The backtrack log 551 may contain any data, but preferably contains at least sufficient data regarding a file to recreate the file as it was before any modification was made. The backtrack log 551 can be a file stored in any format, including, for example, a simple text format, or a plurality of records in a database. The use of a database clearly has advantages for the flexible storage and speedy retrieval of modification data, but the invention is not limited to such a configuration. The backtrack log 551 can be stored locally on a developer's client computer, at an SCC server, or on another networked server. The advantage of storing a backtrack log 551 on a server rather than locally is that, should disaster strike the local computer, the backtrack log 551 will remain accessible, and modifications can be reconstructed.

FIG. 6, FIG. 7, FIG. 8, and FIG. 9 demonstrate techniques for capturing data prior to placing the data in a backtrack log 551. First, FIG. 6, FIG. 7, and FIG. 8 illustrate the capture of modification data from the various other processes in a software development environment. Because these other processes modify data in software development files, their functions can be utilized to cooperate with the track modifications processes 550. In this regard, FIG. 6 illustrates that a track modifications process 650 can cooperate with source file modification processes 601 to retrieve modification data to a backtrack log 651. The various source file modification processes 601 that can communicate with the track modifications process 650 are:

Processes for Developer Modifications 602
Processes for Modifications Due to SCC Sync 603
Processes for Modifications Due to a Wizard Operation 604
Processes for Modifications Due to a Designer Operation 605
Processes for Modifications Due to External Automation 606
Processes for Other Modifications 607

FIG. 7 illustrates that a track modifications process 750 can cooperate with project file modification processes 701 to retrieve modification data to a backtrack log 751. Backtrack log 751 may be a single backtrack log for a particular software development, in which case it may be the same backtrack log as that of FIG. 6, namely 651. Alternatively, backtrack logs may be kept separately for each file that is modified. The project file modification processes 701 that can communicate with the track modifications process 750 are:

Processes for Addition/Deletion of Source Files 702
Processes for Project Renames 703
Processes for Source File Order Modifications 704
Processes for Project Reference Modifications 705
Processes for File Compilation and Linker Options Modifications 706
Processes for Property Sheets Modifications 707
Processes for Custom Build Rules Modifications 708
Processes for Build Steps Modifications 709
Processes for Other Modifications 710

FIG. 8 illustrates that a track modifications process 850 can cooperate with solution file modification processes 801 to retrieve modification data to a backtrack log 851. Again, backtrack log 851 may be a single backtrack log for a particular software development, in which case it may be the same backtrack log as that of FIG. 6 and FIG. 7, namely 651 and 751. Alternatively, backtrack logs may be kept separately for each file that is modified. The solution file modification processes 701 that can communicate with the track modifications process 750 are:

Processes for Addition/Deletion of Projects 802
Processes for Project Renames 803
Processes for Project Dependency Modifications 804
Processes for Other Modifications 807

FIG. 9 illustrates various embodiments of the invention in which the track modifications processes 950 capture modifications to files by direct access to the files 901a, 902a, and 903a themselves. In these embodiments, the track modifications processes could determine that a modification is made by comparing a copy of a file prior to a modification and a copy of a file after a modification. Alternatively, the track modifications processes 950 could determine that a modification was made by intercepting or otherwise receiving a signal that modifies a file.

FIG. 10 illustrates the various processes that may be included in track modifications processes 1000. In general, the processes are grouped for purposes of illustration into modifications tracking processes 1010, modifications visual markings processes 1020, modifications grouping processes 1030, file comparisons processes 1040, and modifications navigation processes 1050. Each of these processes may write to and/or read from a backtracking log 1060.

The modifications tracking processes 1010 comprise processes for capturing modifications as described above. These processes may be supplied as defaults 1010a that ship with a software development environment, or may be customized 1100b. Customization may be useful in situations where a developer determines that he or she is only interested in one or more specific types of modifications. In this scenario, the capturing of all modification information for a backtracking log may be unnecessary. The modifications tracking processes may also contain processes for displaying GUI tools for retrieving and reinstating modifications that have been removed from a file, but remain in a backtracking log 1060. In this regard, these processes can support the GUI selection tool described below.

The modifications visual markings processes 1020 can comprise processes for recognizing modifications that have been captured, and generating and displaying visual markings for a GUI. The various types of visual markings that can be used are further described below. The modifications visual markings processes 1020 can comprise default visual markings processes 1020a that ship with a software development environment and place a pre-selected visual marking by modifications in accordance with the likely desires of developers for modification differentiation. The modifications visual markings processes 1020 can also comprise custom visual markings processes 1020b, which are processes that allow for developer input into the appearance of visual markings and the types of modifications that can be distinguished. Finally, the modifications visual markings processes 1020 can comprise interactive visual markings process 1020c that allow a developer to alter a visual marking from a GUI. For example, if a visual marking used to differentiate a particular modification is a blue rectangle, and a developer wishes instead to use a red rectangle, an interactive markings process 1020c could provide the developer with the tools necessary to make the desired change.

Modifications groupings processes 1030 allow developers to define groups and subgroups of modifications which will be marked by particular visual markings. For example, some developers may want to group all modifications that took place on a given day, and further subgroup modifications that took place in the morning and in the afternoon. Other developers may want to group all modifications that took place in the morning between 10:00 AM and 12:00 Noon during a particular week. Modifications grouping processes 1030 can allow the developer to input the characteristics of the modification group he or she wants. This allows common treatment of all modifications that fall in the defined group. If the developer decides to remove a particular modification, all associated file modifications is easily discovered and removed. The track modifications processes 1000 can further include processes to automatically insert or remove modifications that are within a defined group. Just as with the modifications visual markings processes 1020, the modifications grouping processes 1030 can comprise default processes 1030a that define modification groups in a useful way for most developers, custom processes 1030b that allow developer group definitions, and interactive processes 1030c that allow a developer to modify group definitions "on the fly" by adding a particular modification to an existing group.

File comparison processes 1040 allow for the visual marking of differences between files. In various preferred embodiments, such processes 1040 can compare a software file on a developer's client device with an official copy of a software file on a SCC server. This facilitates viewing all the proposed modifications that a developer has made since a last sync operation. The comparison processes 1040 can be default 1040a or custom 1040b comparison processes. Default comparisons may supply a first set of visual markings that correspond to particular types of modifications. Custom comparisons can allow developer specification of the particular visual markings that are desired for developer-defined groups of modifications.

Finally, modifications navigation processes 1050 can allow for navigation of a file based on the modifications made to the file. Various embodiments of a GUI supported by such processes are illustrated in FIG. 3 and FIG. 4b. Such processes 1050 can support a GUI that allows selection of a modification or group of modifications from a list. After a modification is selected, the modification can be presented in a GUI workspace. In some embodiments, the first of a group of modifications may be displayed when a group of modifications is selected. Other embodiments may filter out all file aspects besides the selected group of modifications, and present the modifications as a unified group to the developer.

Exemplary Visual Markings

The features of a software development environment for modifying software files, and tracking the modifications, are set forth above. Following is a description of the various visual markings suitable for use with the invention. Subsequently, the techniques for using such markings to differentiate developer modifications to software files are explained. Finally, the modification navigation and selection tools are described, and the use of these tools for analyzing, accepting, rejecting, and re-implementing previous modifications to software files is further explained.

A visual marking can be any marking in a GUI workspace that indicates a modification independently of the modification itself. Refer to FIG. 3 for various preferred embodiments of the use of visual markings. Here, a plurality of colored, textured, or grayscale rectangular boxes, such as 320, are placed alongside file modifications, such as 321. Different colors can be used to differentiate modifications, as will be described in detail below. Any shape could be substituted for the rectangular boxes, e.g. 320 of FIG. 3. Circles, squares, ovals, stars, or other polygons could be substituted. Color need not be the means for differentiating between modifications. Instead, for example, shape could be used. A star could indicate a first type of modification, while two stars, a circle, or a square indicates another type of modification.

The visual marking need not be always visible. As an alternative, modifications could be provided with pop-up textual information upon a mouseover event. In this embodiment, hovering a mouse selection pointer over a particular modification would operate to display a pop-up information box that gives information differentiating the modification. Alternatively, a small information box could be always visible next to modifications, providing differentiation information without the need to hover a selection pointer. Yet another embodiment of the visual marking could be text color, text font, text size, underlining, and so forth.

Various embodiments may allow developers to customize the markings they wish to use. In such configurations, a first set of visual markings can be supplied as defaults along with a software development environment, and those markings can be altered or expanded according to customer preference. Developers may want to use particular markings to differentiate a specified set of modifications.

Further, the markings supplied for modifications can be supplied automatically, manually, or interactively. In embodiments that supply markings automatically, modifications may be identified by an automated process, and a marking generated and displayed for modifications without any user action to control the type or visibility of a marking. In embodiments that supply a marking manually, the presence of a marking can be controlled entirely by the developer. In other words, a developer can specify that a particular marking is desired for a particular modification or set of modifications, and that marking is made visible only after the developer has so specified. This could be accomplished, for example, by allowing a developer to select one or more modifications, e.g. by highlighting them, and providing a menu item that generates a particular marking for the selected modification.

Embodiments that allow for interactive visual markings may present developers with a hybrid of the automatic and manual visual marking techniques described above. Here, a visual marking may be supplied automatically based on an automatic differentiation of the modification made, but the developer can subsequently alter the marking, by changing its properties or removing the marking altogether.

Figure 11:
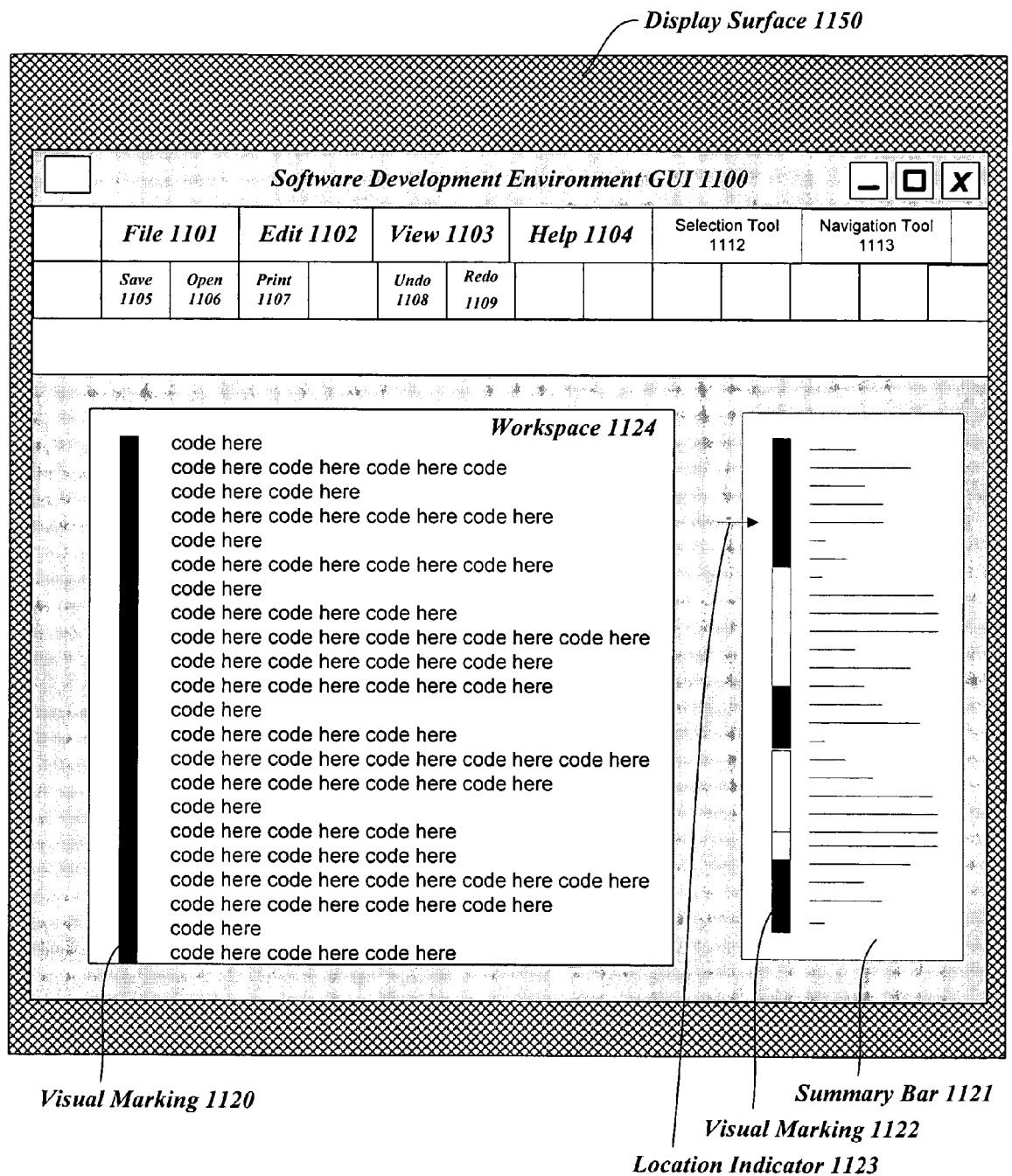
FIG. 11 illustrates a software development environment GUI with a summary bar for easy navigation among the various modifications made to a software file. The summary bar and the workspace both have visual markings to differentiate modifications.

While in preferred embodiments the visual markings are presented in a workspace 322 of a software development environment GUI 300, the visual markings may be presented elsewhere as well. A useful additional feature of the invention demonstrating this concept is illustrated in FIG. 11. A GUI can provide a summary bar 1121 that summarizes the modifications to an entire software file. The summary bar 1121 can show a condensed version of a software file. While the workspace 1124 shows file properties in a size sufficient to easily view and modify the file, the summary bar 1121 can show the properties in miniature for the purpose of summarizing file content and navigation to desired locations in a file. FIG. 11 shows a location indicator 1123 arrow that indicates to a viewer a location that is currently displayed in the workspace 1124. Visual marking 1120 shows that all modifications in the workspace 1124 are of a particular group. From the visual marking 1122 in the summary bar 1121 it is seen that there are several other groups of modifications in the file. If the developer want to analyze all modification that are marked with black visual markings, this can be easily accomplished using the summary bar 1121.

In some embodiments, a separate visual marking may be generated for each and every modification made to a software file. For example, every keystroke on a keyboard input device that enters a new text letter or number into a software file could be considered a modification, and could be supplied with a visual marking. However, such embodiments could become confusing for developers and computationally expensive where many modifications are made. Therefore, preferred embodiments of the invention engage in some grouping of modifications for visual marking. For example, modifications could be visually marked only on a line-by-line basis. If a modification is made anywhere in a line of code, then that line is supplied with a visual marking. This is illustrated in FIG. 3, where visual markings such as 320 are used only on the left hand side of the workspace 322 to indicate that a particular line, e.g. 321 has been modified. Other means of grouping modifications for visual marking may also prove useful, such as marking each continuous string of characters of a modification, highlighting the modifications that are otherwise marked on the file border as in FIG. 3, and so on.

Exemplary Differentiation of Modifications

The common functions of a software development environment for modifying software files and tracking the modification are described above. Further described are the properties of visual markings that can be used to differentiate modifications. Described immediately below are exemplary techniques for differentiating modifications using such visual markings. Finally, the modification navigation and selection tools are described, and the use of these tools for analyzing, accepting, rejecting, and re-implementing previous modifications to software files is further explained.

Differentiation of modifications can be accomplished in a wide variety differentiation techniques. The invention is not limited to any specific technique for modification differentiation. The following suggested techniques are intended to provide useful examples that can be further expanded to accommodate the modification differentiation needs of individual developers.

Differentiation comprises using different visual markings to identify different modifications and groups of modifications. A first type of modifications can be visually marked with a first visual marking, while a second type of modifications can be visually marked with a second visual marking. This allows a developer to easily recognize useful information about modifications displayed in a workspace, and allows for easy navigation and insertion/removal of modifications. In the exemplary GUI of FIG. 3, the modifications are differentiated according to the following groupings:

Modifications on Date #1 (331) are differentiated using a black rectangle

Modifications pursuant Action #3 on Date #1 (332) are differentiated using a checkered rectangle Modifications on Date #2, time interval #3 (333) are differentiated using a white rectangle Modifications pursuant to Action #12 (334) are differentiated using a gray rectangle As these groupings show, differentiation can be made according to dates of modifications, time of modifications, actions associated with modifications, and/or combinations of the above. Thus, modifications made on April 12 can be differentiated from all other modifications. Modifications made on a morning can be differentiated from afternoon modifications. Modifications that are made pursuant to the operation of a wizard or designer can be distinguished from modifications made by hand. Modifications that have been saved can be distinguished from modifications that have not been saved, and so on. In various preferred embodiments of the invention, it may prove useful to differentiate the following more specific groups of modifications:

Modifications by the developer since the last time the file was saved

Modifications by the developer since the file was opened in the software development environment Modifications by the developer since the file was checked out of SCC Modifications due to a SCC action Modifications by a wizard that the developer invoked Modifications by designers Modifications by an add-in or a macro As explained above, the modifications can be differentiated by supplying them with different visual markings. For example, rectangles of different colors could be supplied to each of the modification types above. Where a single modification falls into multiple groups, the modification may be supplied with multiple visual markings. Alternatively, a most important or a most recent visual marking can be selected and used to differentiate the modification that falls into multiple differentiation groups. Further, visual markings could change colors to provide differentiation of modifications. For example, a modification that was made recently could be light red in color, and a modification that was made one or more weeks in the past could be in a darker shade of red. A modification that was made today may turn to a darker shade the next week, and a modification that was made last week could turn even darker. Another technique for differentiating one marking from another is to provide pop-ups with information pertaining to a modification such as the time/date/user/method/etc. Pop-ups could be activated on mouseover events.

Differentiation can be made uniformly across all files, or can be conducted differently for different files. In various embodiments, project and solution files that have been added, renamed, or modified in their build properties can be supplied with a different set of visual markings as files that have not undergone such changes. This gives developers a constant reminder that changes have been made that affect important aspects of these files.

Exemplary Modification Selection and Navigation

The common functions of a software development environment for modifying software files and tracking modifications, the properties of visual markings that can be used to differentiate modifications, and techniques for differentiating modifications using such visual markings are set forth above. This section describes modification navigation and selection tools that can be included in various embodiments of the invention. The next section provides a general description of a suitable computing environment for practicing the techniques of the invention.

Modification selection comprises techniques for performing operations across all modifications of a particular group. The group may be a group that is differentiated by a specific visual marking, as described above, it may be a group that is defined by a developer, or it may be a group comprising a single modification. Importantly, the modifications that may be selected in preferred embodiments extend beyond modifications that are represented in a software file to modifications that are represented in a backtracking log associated with the software file.

A modification selection tool 312 is provided in FIG. 3. The selection tool 312 can be activated through a GUI 300 menu item such as 312, or can be activated in some other fashion, such as by right-clicking on a modification with a mouse or other selection device, hovering over a modification with a selection device, double-clicking on a visual marking associated with a modification, and so forth. The selection tool 312 can give a range of operations to be performed with respect to a modification or group of modifications as illustrated in FIG. 4*a*.

Figure 4A:
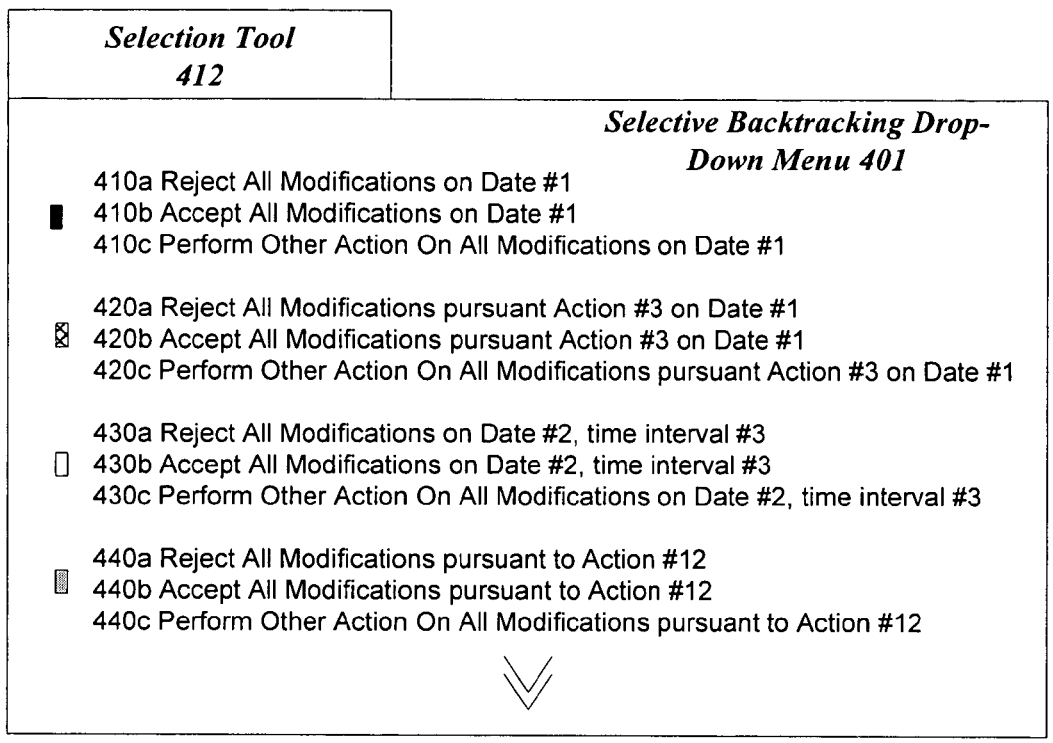
FIG. 4a illustrates a more detailed view of the selection tool from FIG. 3. In the illustrated embodiment, the selection tool can be a menu item with a drop-down menu of selectable actions to perform on software modifications.
Figure 4B:
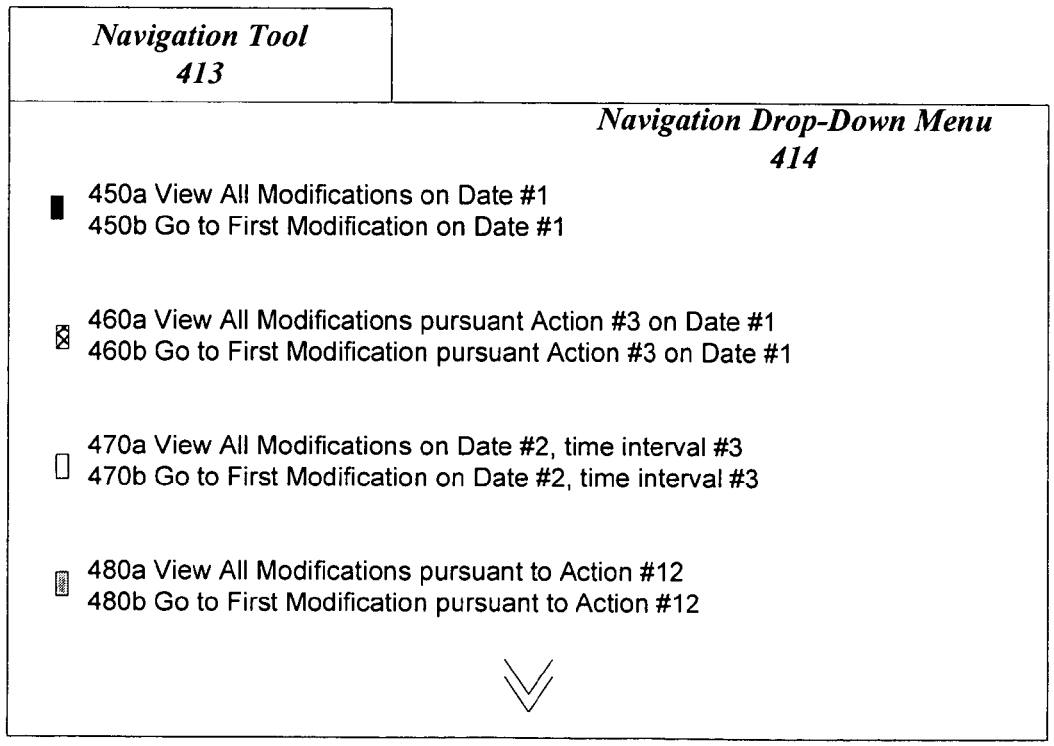
FIG. 4b illustrates a more detailed view of the navigation tool from FIG. 3. In the illustrated embodiment, the navigation tool can be a menu item with a drop-down menu of selectable views of software modifications.

FIG. 4*a* illustrates an exemplary drop down menu 401 for a selection tool 412 in a development tool GUI such as 300. The drop-down menu 410 gives a list of modifications and provides a selection of likely operations, e.g. 410*a*, 410*b*, and 410*c* that can be performed on the modifications. Because a developer is primarily concerned with whether modifications are or are not included in a software file, the operations provided in the selection tool menu 401 comprise rejecting, e.g. 410*a*, and accepting, e.g. 410*b* a modification.

Rejection a modification or group of modifications can operate to remove all file properties associated with the modification. The properties of the file that were modified are returned to the state they were in prior to the modification. Accepting a modification can involve confirming that the modification is to be included in a file, which may operate to alter the visual marking associated with the modification. Alternatively, accepting can comprise re-implementing a modification that has been removed to the backtrack log. An advantage of this aspect of the invention over current development environment is the ability to select any modification from a history of modifications. Unlike the "undo" and "redo" that are presently available, the selection tool allows for re-implementing modifications that have been removed, without undoing all other modifications that were made subsequent to the removal of the desired modifications. Thus, this aspect of the invention allows for both backtracking a most recent modification, and backtracking one or more specific modifications—for example by rejecting a group of related modifications without rejecting modifications that occurred before or after the specific modifications.

For example, consider a developer that makes the following modifications to a software file, in the following order:

1. Add file1.cpp to the project
2. Add file2.cpp to the project
3. Add a class to file1.cpp
4. Add another class to file2.cpp
5. Change compilation settings for file1.cpp The developer could use a selection tool 412 select to reject the "add file1.cpp to the project" modification, and this could operate to remove modifications 1, 3 and 5 while keeping modifications 2 and 4. Modifications 2 and 4 would remain listed on the selective backtracking drop-down menu 401 for later action should it be desired. The rejected changes could be later be reinstated by returning to the selective backtracking drop-down menu 401 and rejecting the rejection of the modification 1, which was itself a modification. Appropriate diffing engine logic for the insertion/deletion capabilities may be applied to properly present the modifications in the selection tool 412 and store the modifications in the backtracking log.

FIG. 4*a* also presents a "perform other operations" option, e.g. 410*c*, through the selection tool 412. This selectable operation 410*c* can provide for performing a custom action on the selected modification or group of modifications. The custom action can be defined by a developer, or can be selected from a list of custom operations. The perform other operations option is designed to illustrated in FIG. 6 that while rejecting and accepting changes may be the most frequently used operations from a modification selection tool, other operations may also be made available from such a tool 412.

FIG. 4*b* presents a navigation tool 413 such as the navigation tool 313 provided in the GUI 300 of FIG. 3. The navigation tool 413 can expand to display a navigation drop-down menu 414 with a list of navigation destinations. Just as with the selection tool 412, the navigation tool 413 can be configured for GUI presentation in some other fashion, such as by right-clicking on a modification with a mouse or other selection device, hovering over a modification with a selection device, double-clicking on a visual marking associated with a modification, and so forth.

The navigation tool 413 allows for speedy modification-based navigation. As suggested by FIG. 4*b*, modification-based navigation can be configured in at least two ways. First, by selecting a modification or group of modifications from the navigation tool, a developer can be provided with a condensed view of all desired modifications independently of any other modifications or other file properties, e.g. as in 450*a*.

Second, a developer can be directed to the first appearance of a modification of a particular type, e.g. as in 450b.

Exemplary Computing and Network Environment

Figure 2A:
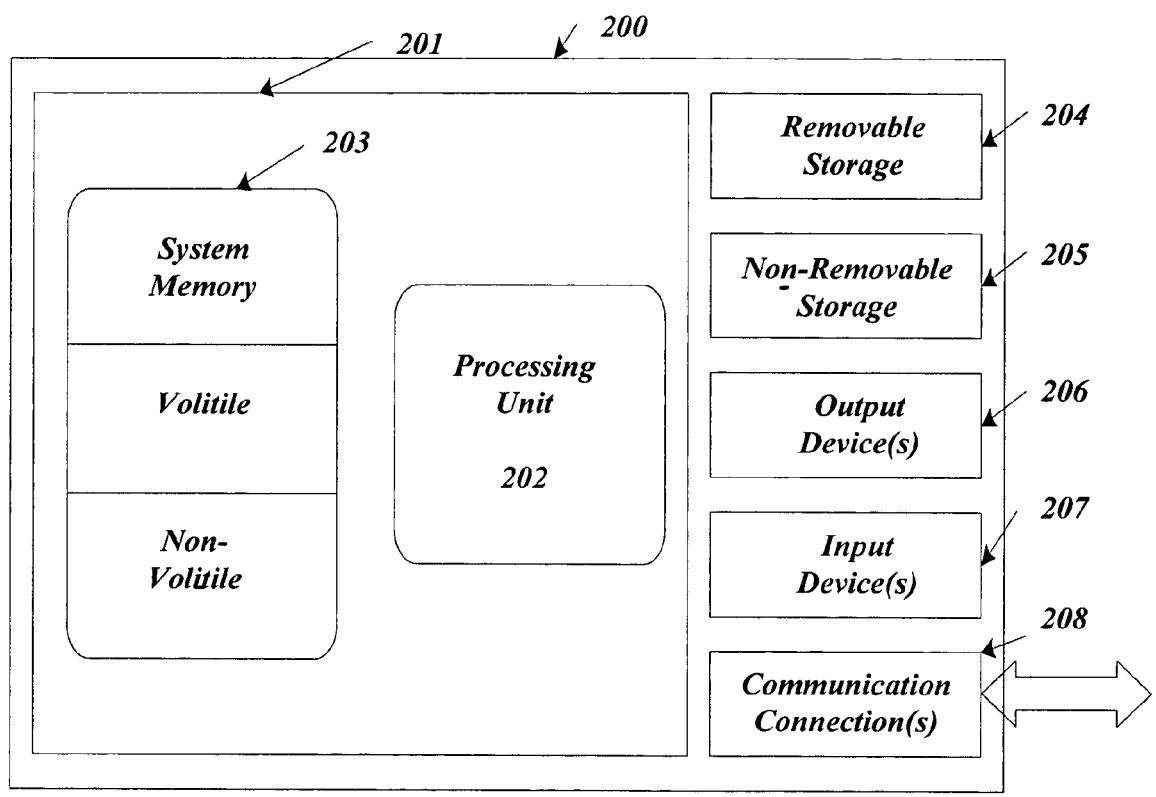
FIG. 2a is a block diagram broadly representing the basic features of an exemplary computing device suitable for use in conjunction with various aspects of the invention.

With reference to FIG. 2a, an exemplary computing device 200 suitable for use in connection with the systems and methods of the invention is broadly described. In its most basic configuration, device 200 typically includes a processing unit 202 and memory 203. Depending on the exact configuration and type of computing device, memory 203 may be volatile (such as RAM), non-volatile (such as ROM, flash memory, etc.) or some combination of the two. Additionally, device 200 may also have mass storage (removable 204 and/or non-removable 205) such as magnetic or optical disks or tape. Similarly, device 200 may also have input devices 207 such as a keyboard and mouse, and/or output devices 206 such as a display that presents a GUI as a graphical aid accessing the functions of the computing device 200. Other aspects of device 200 may include communication connections 208 to other devices, computers, networks, servers, etc. using either wired or wireless media. All these devices are well known in the art and need not be discussed at length here.

Figure 2B:
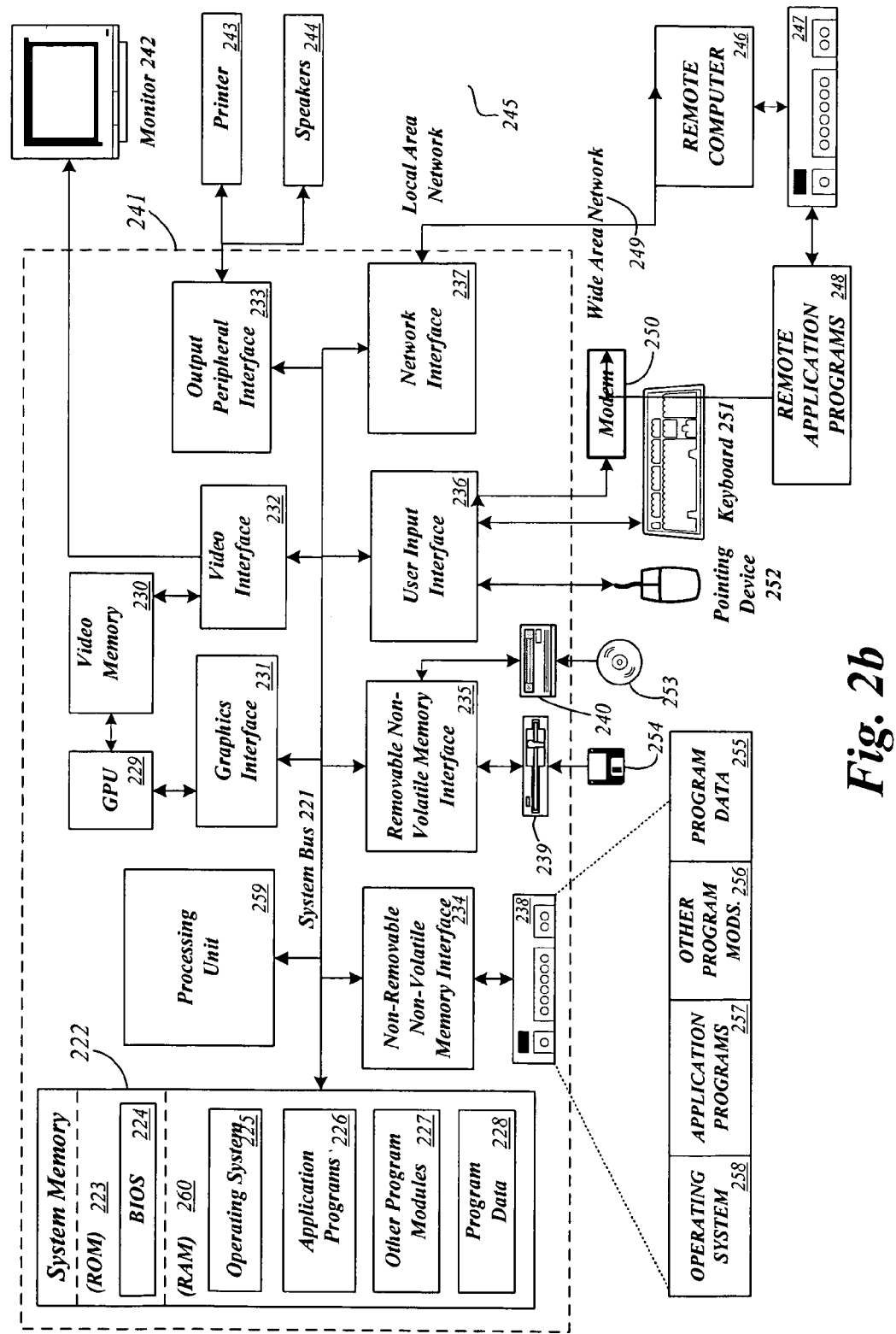
FIG. 2b is a block diagram representing a more detailed exemplary computing device suitable for use in conjunction with various aspects of the invention.

FIG. 2b illustrates a somewhat more detailed example of a suitable computing device from FIG. 2a and peripheral systems. The computing system environment 220 is only one example of a suitable computing environment and is not intended to suggest any limitation as to the scope of use or functionality of the invention. Neither should the computing environment 220 be interpreted as having any dependency or requirement relating to any one or combination of components illustrated in the exemplary operating environment 220.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be implemented in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2b, an exemplary system for implementing the invention includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

Figure 1A:
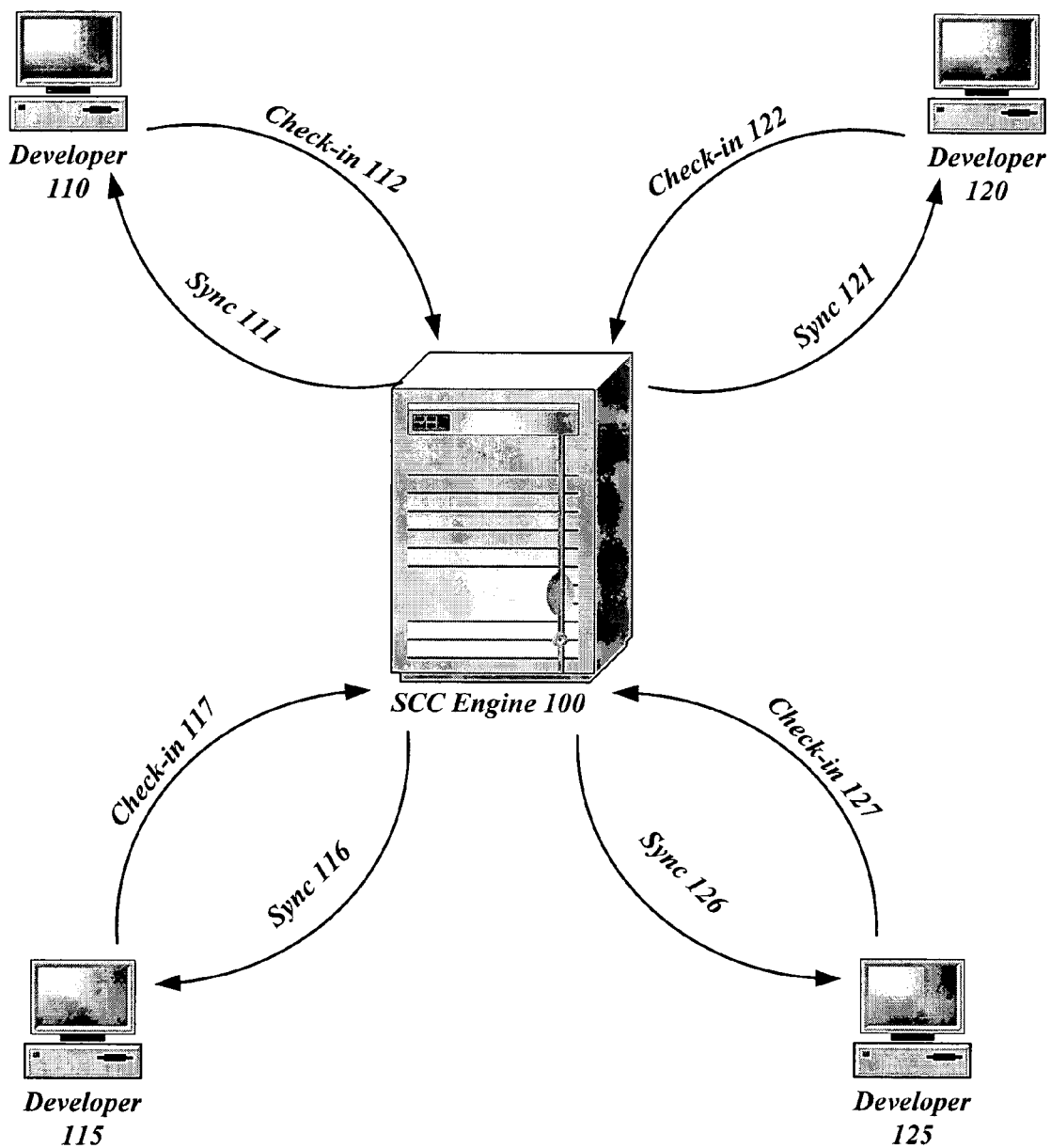
FIG. 1a illustrates a typical prior art software development environment in which multiple developers work on software. Sync operations provide developers with an official copy of software under development, as maintained by a central server, and check-in operations upload a developer's modifications to the central server.
Figure 1B:
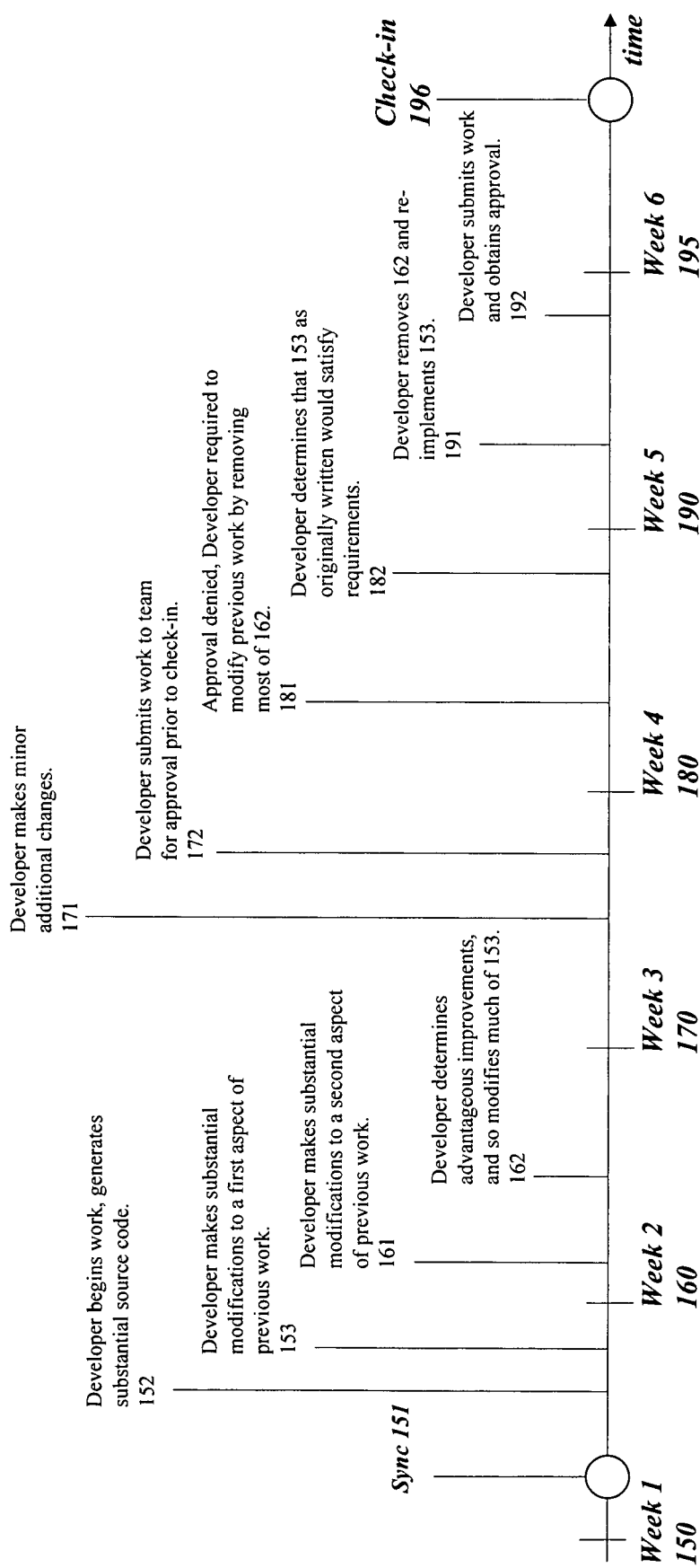
FIG. 1b illustrates an exemplary prior art timeline for developer modifications to software between sync and check-in operations. A developer may make substantial modifications, and subsequent re-modifications, during such a period. Besides "undo" and "redo" information kept in session memory, no helpful record of the modifications is available. A developer must re-implement modifications that have been removed.
Figure 1C:
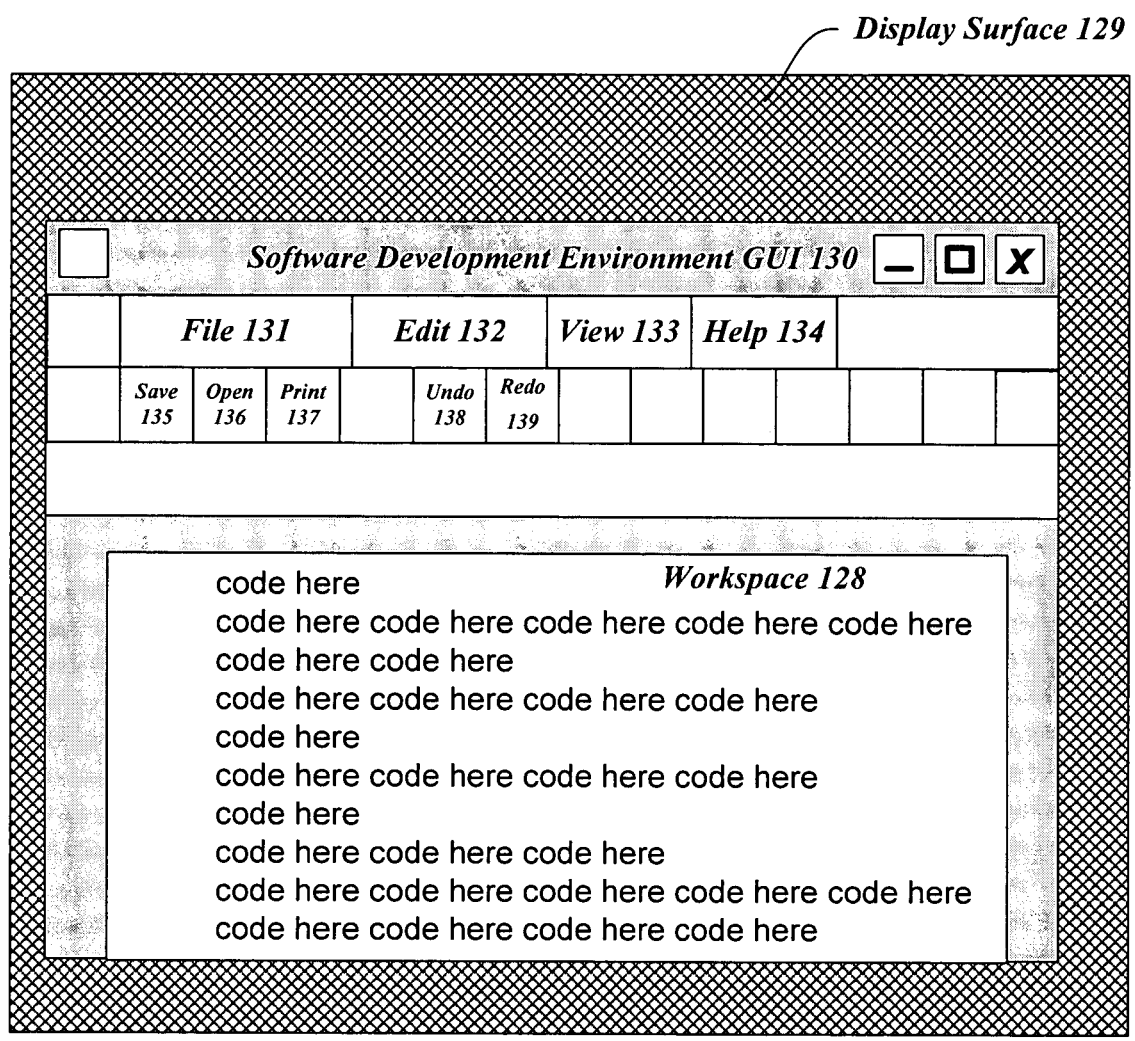
FIG. 1c illustrates a prior art software development environment GUI. Such a GUI has "undo" and "redo" options. It will typically also provide an environment for facilitating changes to source files, project files, and solution files.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 2b, provide storage of computer readable instructions, data structures, program modules and other data for the computer 241. In FIG. 2b, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 2b. The logical connections depicted in FIG. 2b include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 2b illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments refer to utilizing the present invention in the context of one or more stand-alone computer systems, the invention is not so limited, but rather may be implemented in connection with any computing environment, such as a network or distributed computing environment. Still further, the present invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Figure 2C:
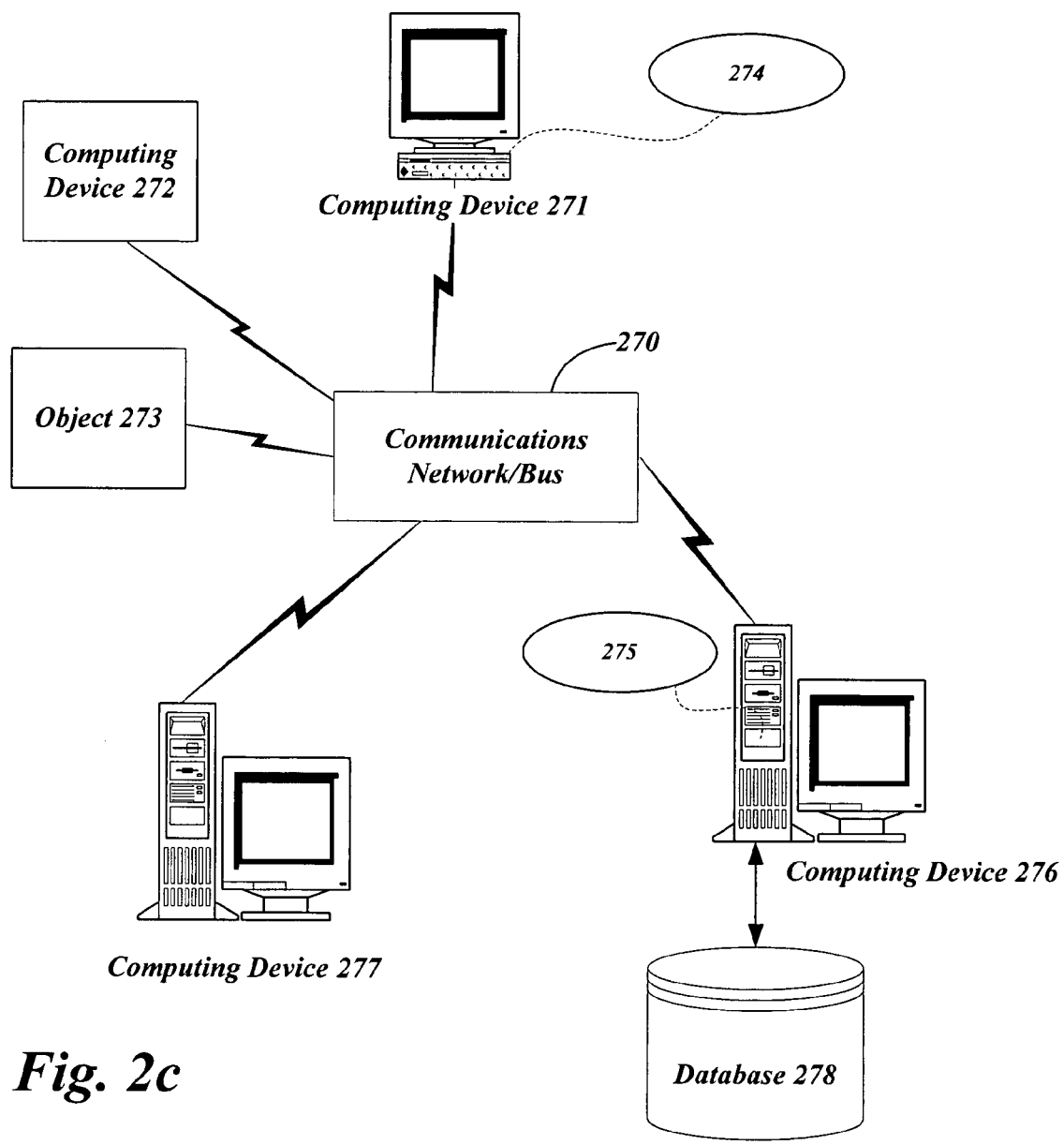
FIG. 2c illustrates an exemplary networked computing environment in which may computerized processes, including those of the invention, may be implemented.

An exemplary networked computing environment is provided in FIG. 2c. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2c provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2c, and may itself represent multiple interconnected networks. In accordance with an aspect of the invention, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2c, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework of provided in FIG. 2a and FIG. 2b, and the further diversification that can occur in computing in a network environment such as that of FIG. 2c, the systems and methods provided herein cannot be construed as limited in any way to a particular computing architecture. Instead, the present invention should not be limited to any single embodiment, but rather should be construed in breadth and scope in accordance with the appended claims.

What is claimed:

1. A computer system comprising storage media with appropriate instructions for displaying a graphic user interface (GUI) for exposing a software development environment, said GUI comprising:
   a software development environment GUI;
   a workspace within said GUI for displaying files, wherein a developer can modify at least one file when said file is displayed in said workspace during each editing session;
   at least one first type of visual marking that identifies first modifications to said at least one file, wherein said at least one first type of visual marking identifies a cause of said first modifications to be a source code control (SCC) sync and merge operation;
   at least one second type of visual marking that identifies second modifications to said at least one file, wherein said at least one second type of visual marking identifies a cause of said second modifications to be an operation other than said SCC sync and merge operation;
       wherein said at least one first type of visual marking differs from said at least one second type of visual marking;
   wherein at least one backtracking log file persists over a plurality of editing sessions a history of manually and automatically caused modifications of properties and contents of said file, including said first and second modifications; and
       wherein said GUI permits said developer to select one or more of said modifications, respectively identified by said types of visual markings and persisted in said backtracking log file over a plurality of editing sessions, to reject said selected one or more modifications to restore said file to a state preexisting said modifications.

2. The computer system of claim 1, wherein said files comprise source files.

3. The computer system of claim 2, wherein said at least one second type of visual marking identifies a modification made by a developer without the assistance of automated code generation processes.

4. The computer system of claim 2, wherein said at least one second type of visual marking identifies a modification made pursuant to the operation of a wizard.

5. The computer system of claim 1, wherein said files comprise solution files.

6. The computer system of claim 5, wherein said at least one second type of visual marking identifies one or more of an addition of a project and a deletion of a project.

7. The computer system of claim 5, wherein said at least one second type of visual marking identifies a project name change or a project dependency change.

8. The computer system of claim 1, wherein said files comprise project files.

9. The computer system of claim 8, wherein said at least one second type of visual marking identifies one or more of an addition of a source file and a deletion of a source file.

10. The computer system of claim 8, wherein said at least one second type of visual marking for identifying a modification identifies a project rename.

11. The computer system of claim 8, wherein said at least one second type of visual marking identifies one or more of a change in source file ordering and a source file rename.

12. The computer system of claim 1, wherein said second type of visual marking further comprises a colored area presented in a margin of at least one of said files.

13. The computer system of claim 1, wherein a plurality of visual markings are generated to differentiate a plurality of modifications.

14. The computer system of claim 13, said GUI further comprising a third type of visual marking that is used to differentiate modifications made to at least one of said files by the developer since a most recent save of the file.

15. The computer system of claim 13, said GUI further comprising a third type of visual marking that is used to differentiate modifications made to at least one of said files since the file was opened in the software development environment.

16. The computer system of claim 13, said GUI further comprising a third type of visual marking that is used to differentiate modifications made to at least one of said files due to the operation of one or more of a wizard, a designer, a macro, and an add-in.

17. The computer system of claim 1, wherein said at least one backtracking log file maintains a history of manually and automatically caused modifications of the properties and contents of a plurality of related files.

18. The computer system of claim 17, wherein said history supports restoration of the modified portion of at least one of said files to a pre-modified state.

19. The computer system claim 1, wherein said GUI comprises a selection tool that provides a list of modifications and allows a developer to reject one or more modifications on the list of modifications.

20. A computer readable storage medium comprising computer executable instructions for a software development environment, said software development environment comprising:
   a tool for customizing file modification markings, said tool allowing for designating a first type of marking to be used when a file modification is made by a developer without the assistance of automated code generation processes, and allowing for designating a second type of marking to be used when said file modification is made via a source code control (SCC) sync and merge operation, wherein said second type of marking differs from said first type of marking;
   a selection tool for rejecting file modifications, wherein:
      a rejection of modifications marked with said first type of marking comprises a restoration of all modifications marked with said first type of marking to a state pre-existing said modifications marked with said first type of marking;
      a rejection of modifications marked with said second type of marking comprises a restoration of all modifications marked with said second type of marking to a state pre-existing said modifications marked with said second type of marking;
   wherein at least one backtracking log file persists said file modifications over a plurality of editing sessions; and
   wherein said selection tool permits selection of one or more of said file modifications, respectively identified by said types of visual markings and persisted in said backtracking log file over a plurality of editing sessions, for said rejections.

21. The computer readable storage medium of claim 20, wherein said at least one backtracking log file maintains a history of manually and automatically caused modifications of the properties and contents of a plurality of related files.

22. The computer readable storage medium of claim 21, wherein said history comprises sufficient data to support said rejection of-modifications marked with said first type of marking.

23. The computer readable storage medium of claim 20, said software development environment further comprising a navigation tool that supplies a list of modifications, wherein selection of a modification from the list of modifications causes the modification to be displayed in a GUI workspace.

24. The computer readable storage medium of claim 20, said software development environment further comprising a modification grouping tool for defining groups of modifications, and wherein said groups of modifications can be rejected with a single rejection.

25. The computer readable storage medium of claim 20, said software development environment further comprising a summary bar displaying a miniature view of a file while also displaying a workspace view of the file.

* * * * *